Patented Oct. 2, 1945

2,385,929

UNITED STATES PATENT OFFICE 2,385,929

WATER SOFTENING AND WASHING PRODUCT AND METHOD OF PREPARING SAME

Leonard Meites, Chicago, Ill.

No Drawing. Application March 13, 1942,
Serial No. 434,478

16 Claims. (Cl. 252—135)

My invention relates to the preparation of new and highly useful alkali metal phosphate compounds, particularly sodium phosphate compounds, and to the resulting products. It is also concerned with the utilization of said novel compounds for the softening of water, for the preparation of washing compositions for utilization in the washing of clothes and the like, and for numerous other purposes, all as more particularly and more fully pointed out hereinafter.

The novel alkali metal, for example, sodium phosphate compounds of my invention are prepared by reacting monosodium dihydrogen phosphate with a trialkali metal orthophosphate, particularly trisodium orthophosphate, at elevated temperatures but below the fusion point of the reaction mixture and also below the temperature of disintegration of the desired reaction product, the molal ratio of the trialkali metal orthophosphate to the monosodium dihydrogen phosphate being between approximately one to two and two to two. In the preparation of my novel reaction products, I have found it particularly advantageous to utilize crystalline trisodium phosphate containing twelve molecules of water of crystallization ($Na_3PO_4.12H_2O$) and, where reference is made to molal ratios, it will be understood that I utilize the numerical value of 380 as the molecular weight of the crystalline trisodium phosphate. I also prefer, particularly, to employ monosodium dihydrogen phosphate containing one molecule of water of crystallization ($NaH_2PO_4.H_2O$) and, where reference is made to molal ratios, it will be understood that I utilize the numerical value of 138 as the molecular weight of the monosodium dihydrogen phosphate. Where different products are utilized, for example, anhydrous monosodium dihydrogen phosphate or monosodium dihydrogen phosphate containing two molecules of water of crystallization, an adjustment should be made in determining the molal ratios.

The exact structure of my novel alkali metal phosphate products has not yet been fully ascertained and, therefore, I deem it best and most accurate to characterize my novel products as reaction products of the defined reactants produced by heating under stated temperature conditions.

As I have pointed out hereinabove, the reaction mixture should not be heated to a temperature sufficiently high to fuse the reaction mixture nor, as I have stated, should it be heated to a temperature sufficiently high to effect disintegration of the desired reaction product. The temperature at which the reaction best proceeds, generally speaking, is that corresponding to a dull red heat, and ranges to that approaching a bright red heat. In terms of temperature values, a satisfactory range is from approximately 300 degrees C. to approximately 525 degrees C., although the temperature may vary somewhat from these values. If the reaction mixture is heated at or above that temperature which I characterize as the temperature of disintegration of the desired reaction product, the desired reaction product appears to break down into what evidently comprises tetra-alkali metal pyrophosphate and alkali metal metaphosphate, or, in my particularly preferred embodiment, tetrasodium pyrophosphate and sodium metaphosphate.

In order that those skilled in the art may more fully understand the manner in which my novel reaction products are produced, I set forth hereinbelow representative examples which, it will be understood, are illustrative and are in nowise to be construed as limitative of the full scope of my invention. Thus, for example, the proportions of the reactants may be varied, different trialkali metal orthophosphates and monoalkali metal dihydrogen phosphates may be utilized, and the temperatures and times of reaction may be varied, within limitatitons, without departing from the spirit of my invention.

Example 1

380 parts by weight of crystalline trisodium phosphate ($Na_3PO_4.12H_2O$) and 276 parts by weight of powdered monosodium dihydrogen phosphate ($NaH_2PO_4.H_2O$) were mixed together and heated to dryness at a temperature of approximately 400 degrees C.–450 degrees for a period of one-half hour with periodic mixing. The resulting reaction product was then permitted to cool. It comprised a readily water-soluble, white crumbly or powdered material having exceptional properties as a water-softening agent.

Example 2

760 parts by weight of crystalline trisodium phosphate ($Na_3PO_4.12H_2O$) were admixed with 276 parts by weight of monosodium dihydrogen phosphate ($NaH_2PO_4.H_2O$) and the reaction mixture was heated, with periodic stirring or mixing, at a temperature ranging from 350 degrees C.–450 degrees C. for a period of about one hour. The resulting reaction product was a readily water-soluble white crumbly or powdered material which had exceptionally satisfactory properties as a water-softening agent and for other purposes as hereinafter disclosed.

Example 3

570 parts by weight of crystalline trisodium phosphate ($Na_3PO_4.12H_2O$) were admixed with 276 parts by weight of monosodium dihydrogen phosphate ($NaH_2PO_4.H_2O$) and the reaction mixture was heated, with periodic stirring or mixing, at a temperature ranging from 400 degrees C.–450 degrees C. for a period of about one hour. The resulting reaction product had properties similar to those of Examples 1 and 2.

A very satisfactory and convenient test to ascertain when the reaction between the trisodium phosphate and the monosodium dihydrogen phosphate is completed is to make up an aqueous solution of the reaction product and add it to a dilute aqueous solution of silver nitrate. If the reaction product is not finished, a yellow or yellowish precipitate forms. If, however, a white precipitate forms, the reaction product may be considered to be finished and satisfactory.

In those cases where the crystalline trisodium phosphate employed contains free caustic soda or sodium carbonate, which is usually the case with the ordinary commercial trisodium phosphate products, I have found it advantageous initially to neutralize or substantially neutralize the said free caustic soda or sodium carbonate, as the case may be, with an inorganic acid, particularly orthophosphoric acid, before reacting the crystalline trisodium phosphate with the monosodium dihydrogen phosphate. Alternatively, although not so satisfactorily, I may utilize sufficient monosodium dihydrogen phosphate in excess of that of the desired molal ratios to effect the neutralization. On the other hand, where the crystalline trisodium phosphate utilized contains free disodium monohydrogen orthophosphate ($Na_2HPO_4$), I find it advantageous, initially, to admix the said crystalline trisodium phosphate with an alkali, preferably caustic soda, to convert the disodium monohydrogen orthophosphate into trisodium phosphate, or, alternative, and more particularly satisfactorily, with phosphoric acid to convert the disodium monohydrogen phosphate into monosodium dihydrogen phosphate before the reaction with the monosodium dihydrogen phosphate. Instead of preliminarily neutralizing the caustic soda or sodium carbonate or the like with phosphoric acid, the amount of phosphoric acid required may first be ascertained and it, together with the trisodium phosphate and the monosodium dihydrogen phosphate, may be admixed together and heated to the reaction temperature. Where I refer in the claims to preliminary neutralization of the caustic soda or the like in the trisodium phosphate, it will be understood to cover this and other alternative methods.

My novel reaction products may be used for the treatment of water and for washing purposes, for the sequestering of calcium and magnesium, as deflocculating agents, and for various uses in the textile and other industries and under generally similar conditions to those where heretofore known phosphate or polyphosphate compounds have been employed, as, for example, in the case of the alkali metal metaphosphates as disclosed in Reissue Patent No. 19,719 and in the case of the alkali metal tetraphosphates as disclosed in Patent No. 2,059,570. Under these circumstances, I do not deem it necessary to enlarge upon the various uses to and exact manner in which my novel reaction products may be placed, such uses and the manner thereof being, in the main, disclosed in such patents as those mentioned hereinabove as well as other patents as, for example, Patents Nos. 2,149,734; Reissue No. 20,754; 2,092,913; 2,086,867 and the like.

My novel reaction products are, however, sharply distinguishable from heretofore known phosphates such as those disclosed in the aforementioned patents not only in their structure but also with respect to various of their properties. Thus, for example, whereas sodium hexametaphosphate, disclosed in Reissue Patent No. 19,719, has a slightly acid reaction and the sodium tetraphosphate of Patent No. 2,059,570 has a pH of approximately 8.5, my novel reaction products, in like concentrations in aqueous solutions, have a pH of approximately 9 or 9.5 to approximately 10, although the exact pH will vary somewhat depending upon the exact molecular ratios of the reacting constituents employed and the exact temperature conditions under which they are reacted. In view of the pH values which my novel reaction products possess, they may particularly advantageously be utilized in environments or compositions containing various saponaceous materials, especially the higher fatty acid soaps, their alkalinity being generally similar to that of soap solutions. The sudsing of soaps and the stability and volume of foam are distinctly improved by the use of my novel phosphate reaction products. Hence, for example, they readily lend themselves to the preparation of washing compositions containing alkaline substances such as tetrasodium pyrophosphate, sodium carbonate, and the like as well as saponaceous ingredients such as the usual fatty acid soaps, typical compositions containing from 10% to 60% of my novel reaction products, balance, for example, soap. It will be understood, in this connection, that such compositions may contain other alkaline materials and/or diluents or the like to provide dry or powder compositions for distribution and sale for household purposes as well as, of course, for industrial usage.

Further evidence of the different character of my novel reaction products as compared with known phosphates or polyphosphates may be noted with respect to their behavior with aqueous solutions of different chemicals. Illustrative of these is the behavior when solutions of my novel reaction products are added to aqueous solutions of zinc acetate. In the case of my novel reaction products, the zinc acetate solution remains clear for a substantial period of time, whereas, aqueous solutions of sodium hexametaphosphate or sodium tetraphosphate, for example, when added to dilute aqueous solutions of zinc acetate, form precipitates in a relatively short period of time. Even when precipitates are formed, after the lapse of a substantial period of time, when my novel reaction products are utilized, such precipitates have a different character and appearance from those which result where the aforementioned prior art phosphates are utilized. On the other hand, with aqueous solutions of barium chloride, aqueous solutions of my reaction products form precipitates substantially immediately, whereas with the hexametaphosphates and tetraphosphates the barium chloride solution remains clear.

In addition to the advantages of and distinctions between my novel reaction products and those alkali metal phosphates heretofore known, a further and very important advantage resides in the fact that the cost of manufacture of my novel reaction products is materially less than the cost of preparation of such heretofore known agents as sodium hexametaphosphate, sodium tetraphosphate, and the like. In this general connection, I may point out that I regard as especially outstanding and important those of my reaction products which are derived from approximately two mols of crystalline trisodium phosphate and two mols of monosodium dihydrogen phosphate or, in other words, equi-molal ratios of the reactants.

Since various embodiments of my invention may be made without departing from the spirit and scope thereof, in the light of the guiding principles which I have disclosed herein, it is to be understood that I do not limit myself to the specific embodiments of my invention except as pointed out in the claims.

What I claim as new and desire to protect by Letters Patent of the United States is:

1. The method of preparing a water-soluble compound which comprises heating a mixture of crystalline trisodium phosphate and monosodium dihydrogen phosphate, in a molal ratio of from approximately one to approximately two mols of crystalline trisodium phosphate to two mols of monosodium dihydrogen phosphate, at a reaction temperature not substantially below 300 degrees C. but below the temperature of disintegration of the desired reaction product for a period of time sufficient to substantially complete the reaction.

2. The method of preparing a water-soluble compound which comprises heating a mixture of crystalline trisodium phosphate and monosodium dihydrogen phosphate, in a molal ratio of approximately two mols of crystalline trisodium phosphate to two mols of monosodium dihydrogen phosphate, at a temperature ranging from approximately 300 degrees C. to approximately 525 degrees C. for a period of time sufficient to substantially complete the reaction.

3. The method of preparing a water-soluble compound which comprises heating a mixture of trisodium phosphate and monosodium dihydrogen phosphate, in a molal ratio of from approximately one to approximately two mols of trisodium phosphate to two mols of monosodium dihydrogen phosphate, at a reaction temperature not substantially below 300 degrees C. but below the temperature of disintegration of the desired reaction product for a period of time sufficient to substantially complete the reaction.

4. The method of preparing a water-soluble compound which comprises providing a crystalline trisodium phosphate in which any free caustic soda or sodium carbonate present therein is substantially neutralized with phosphoric acid, admixing the resulting trisodium phosphate with monosodium dihydrogen phosphate in a molal ratio of approximately one to approximately two mols of the crystalline trisodium phosphate to two mols of the monosodium dihydrogen phosphate, and heating the resulting mixture at a reaction temperature not substantially below 300 degrees C. but below the temperature of disintegration of the desired reaction product for a period of time sufficient to substantially complete the reaction.

5. The method of preparing a water-soluble compound which comprises providing a crystalline trisodium phosphate in which any free caustic soda or sodium carbonate present therein is substantially neutralized with phosphoric acid, admixing the resulting trisodium phosphate with monosodium dihydrogen phosphate in approximately equal molal ratios, and heating the resulting mixture at the temperatures ranging from 300 degrees C. to 525 degrees C. for a period of time sufficient to substantially complete the reaction.

6. The method of preparing a water-soluble compound which comprises providing a mixture of crystalline trisodium phosphate and monosodium dihydrogen phosphate in approximately equi-molal ratios, heating the resulting mixture at temperatures of 300 degrees C. to 525 degrees C., and then cooling and grinding the reaction mixture to produce a finely divided product for a period of time sufficient to substantially complete the reaction.

7. A water-soluble product comprising a reaction product of crystalline trisodium phosphate and monosodium dihydrogen phosphate, in a molal ratio of from about one to about two mols of crystalline trisodium phosphate to two mols of monosodium dihydrogen phosphate, at a reaction temperature not substantially below 300 degrees C. but below the temperature of disintegration of the desired reaction product and for a period of time sufficient to substantially complete the reaction.

8. A water-soluble product comprising a reaction product of trisodium phosphate and monosodium dihydrogen phosphate, in a molal ratio of from about one to about two mols of trisodium phosphate to two mols of monosodium dihydrogen phosphate, at temperatures ranging from about 300 degrees C. to about 525 degrees C. and for a period of time sufficient to substantially complete the reaction.

9. A water-soluble product comprising a reaction product of substantially equi-molal ratios of crystalline trisodium phosphate and monosodium dihydrogen phosphate, at a reaction temperature not substantially below 300 degrees C. but below the temperature of disintegration of the desired reaction product and for a period of time sufficient to substantially complete the reaction.

10. A water-soluble product having a pH of the order of about 9 to about 10 in aqueous solution and comprising a reaction product of crystalline trisodium phosphate and monosodium dihydrogen phosphate, in a molal ratio of from about one to about two mols of crystalline trisodium phosphate to two mols of monosodium dihydrogen phosphate, at a reaction temperature not substantially below 300 degrees C. but below the temperature of disintegration of the desired reaction product and for a period of time sufficient to substantially complete the reaction.

11. A water-soluble product comprising a reaction product of monosodium dihydrogen phosphate and crystalline trisodium phosphate in which any free caustic soda or sodium carbonate present in the trisodium phosphate is substantially neutralized with phosphoric acid, in a molal ratio of approximately one to approximately two mols of the crystalline trisodium phosphate to one mol of the monosodium dihydrogen phosphate, at a reaction temperature not substantially below 300 degrees C. but below the temperature of disintegration of the desired reaction product and for a period of time sufficient to substantially complete the reaction.

12. A water-soluble product having a pH of the order of about 9 to about 10 in aqueous solution and comprising a reaction product of substantially equi-molal ratios of monosodium dihydrogen phosphate and crystalline trisodium phosphate in which any free caustic soda or sodium carbonate present in the trisodium phosphate is substantially neutralized with phosphoric acid, at a reaction temperature not substantially below 300 degrees C. but below the temperature of disintegration of the desired reaction product and for a period of time sufficient to substantially complete the reaction.

13. A washing composition comprising an alkaline detergent material and a reaction product of crystalline trisodium phosphate and monosodium dihydrogen phosphate, in a molal ratio of from about one to about two mols of crystalline trisodium phosphate to two mols of monosodium dihydrogen phosphate, at a temperature ranging from approximately 300 degrees C. to approximately 525 degrees C. and for a period of time sufficient to substantially complete the reaction.

14. A washing composition comprising a water-soluble soap and a reaction product of crystalline trisodium phosphate and monosodium dihydrogen phosphate, in a molal ratio of from about one to two mols of crystalline trisodium phosphate to two mols of monosodium dihydrogen phosphate, at a reaction temperature not substantially below 300 degrees C. but below the temperature of disintegration of the desired reaction product and for a period of time sufficient to substantially complete the reaction.

15. The method of preparing a water-soluble compound which comprises heating a mixture of crystalline trialkali metal phosphate and monoalkali metal dihydrogen phosphate, in a molal ratio of from approximately one to approximately two mols of crystalline trialkali metal phosphate to two mols of monoalkali metal dihydrogen phosphate, at a reaction temperature not substantially below 300 degrees C. but below the temperature of disintegration of the desired reaction product for a period of time sufficient to substantially complete the reaction.

16. A water-soluble product comprising a reaction product of crystalline trialkali metal phosphate and monoalkali metal dihydrogen phosphate, in a molal ratio of from about one to about two mols of crystalline trialkali metal phosphate to two mols of monoalkali metal dihydrogen phosphate, at a reaction temperature not substantially below 300 degrees C. but below the temperature of disintegration of the desired reaction product.

LEONARD MEITES.